Oct. 26, 1965          C. W. DOERING                3,213,945
              DRAFT SENSING TRACTOR IMPLEMENT HITCH
Original Filed May 2, 1960                         4 Sheets-Sheet 1
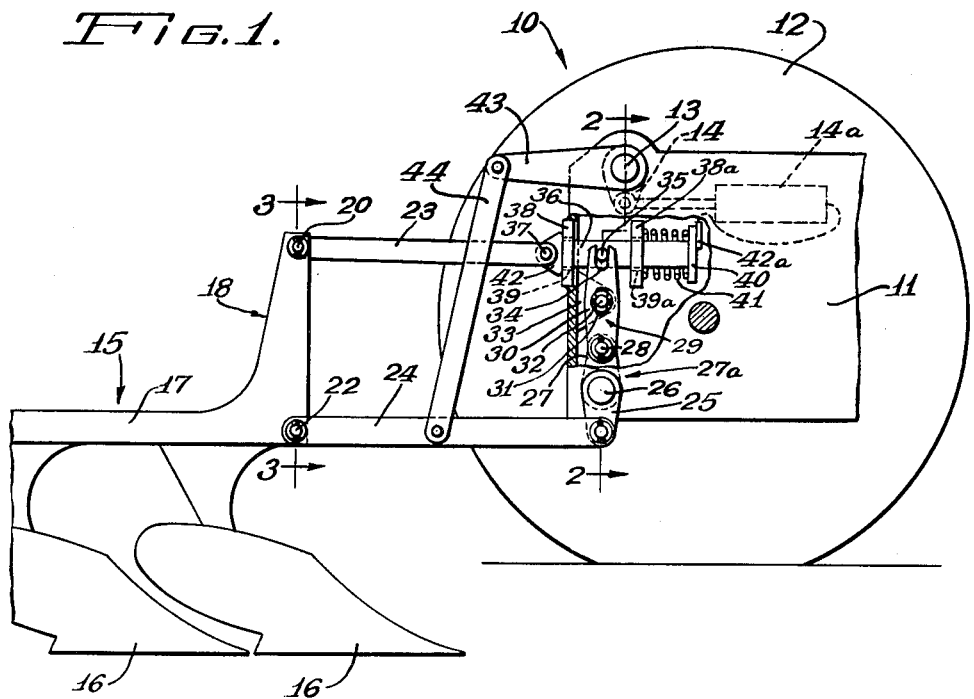
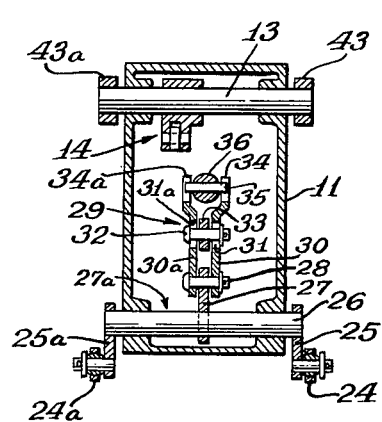
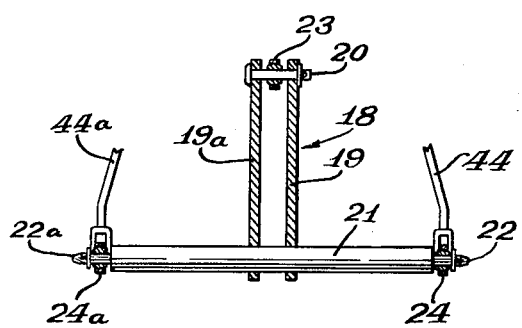
Inventor:
Charles W. Doering

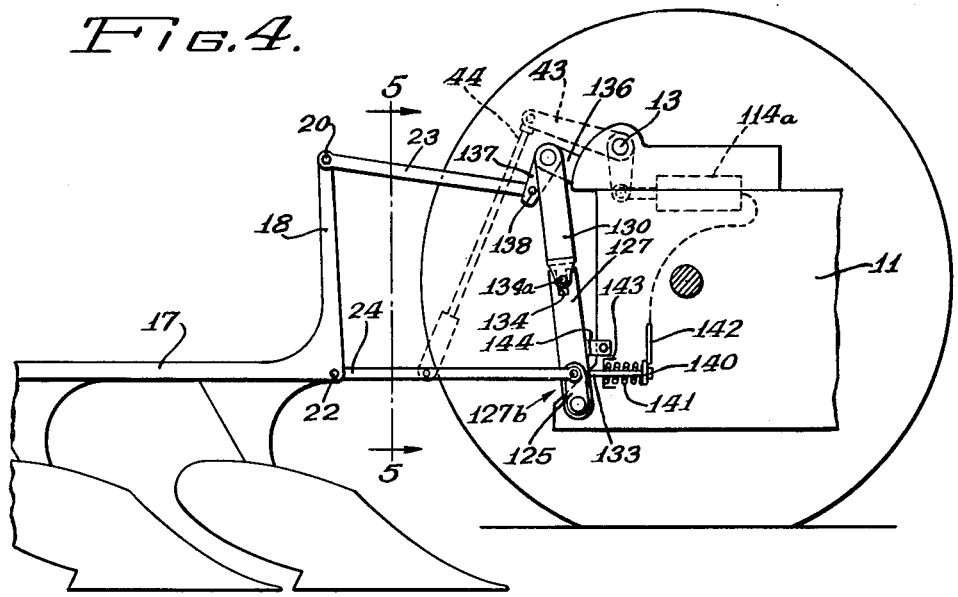
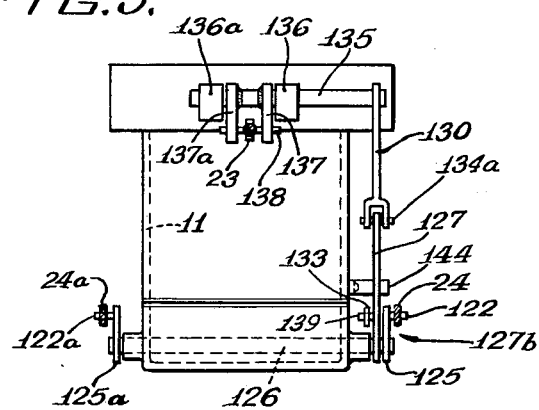

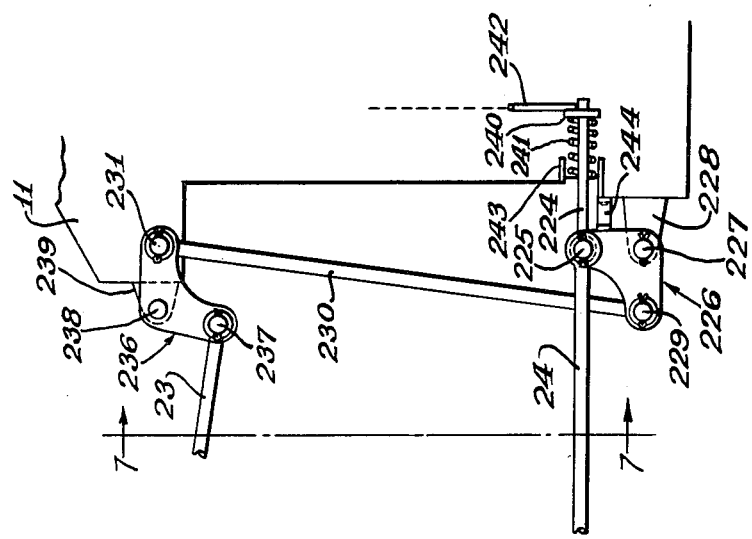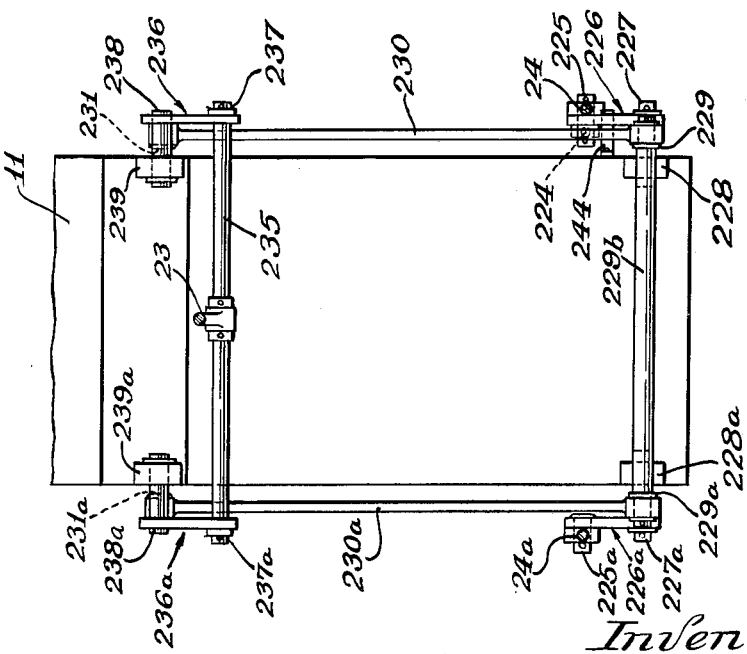

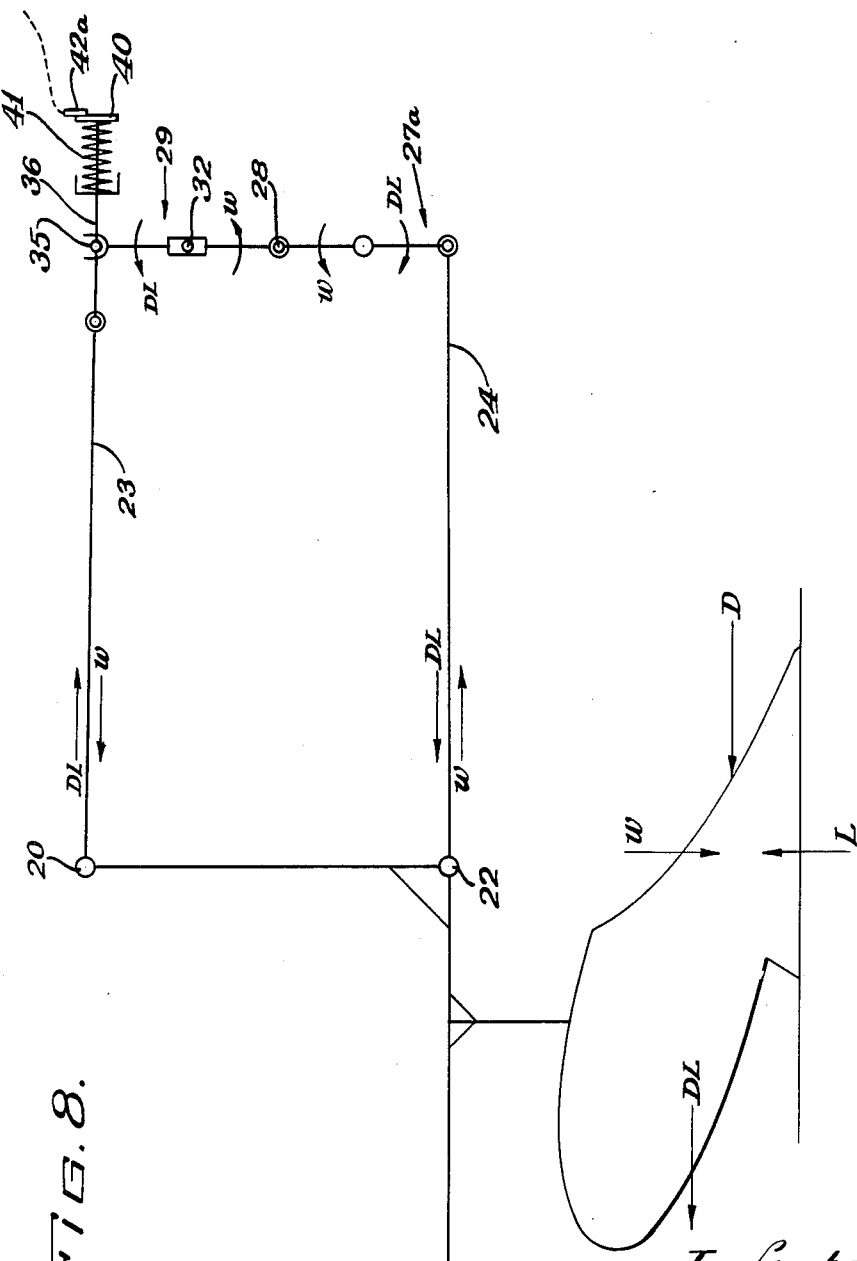

United States Patent Office 3,213,945
Patented Oct. 26, 1965

3,213,945
DRAFT SENSING TRACTOR IMPLEMENT
HITCH
Charles W. Doering, Westchester, Ill., assignor to International Harvester Company, Chicago, Ill., a corporation of New Jersey
Original application May 2, 1960, Ser. No. 26,055, now Patent No. 3,128,830, dated Apr. 14, 1964. Divided and this application May 18, 1962, Ser. No. 210,275
3 Claims. (Cl. 172—239)

This application is a division of applicant's co-pending application Serial No. 26,055, filed May 2, 1960, now Patent No. 3,128,830.

This invention relates to hitch linkage mechanisms as they are employed for attaching or coupling vehicle-borne agricultural implements to a tractor vehicle equipped with an automatically operated power lift device. More particularly, however, it is directed to hitch mechanisms of the three-point type, i.e., where the agricultural implement is hitched or coupled to the vehicle at three points, usually by way of one upper and two spaced-apart lower links, and wherein a stress-responsive member associated with one of these linkage members functions to transmit a sensing signal for automatic control operation of the associated power lift assembly.

Hitch mechanisms of the character with which the present invention is concerned have, heretofore, been recognized as being generally conventional, and in such similar prior art hitch linkages, as was well known, the draft loads imposed on the attached or coupled implement were most frequently sensed or translated by a compressive force reaction in the upper link thereof, which reaction, in turn, initiated the degree of control adjustments required of the power lift mechanism according to the draft load being encountered at that particular moment. In others of such prior devices the draft load force reaction was sensed or registered through one of the lower links, instead of the upper link, but otherwise the hitch linkages were quite similar in operation. In either case, when the draft load was light the implement was automatically adjusted, either by lowering the implement and as a result thereof modifying the pitch of the implement in one direction to compensate for such draft change, and vice versa when the draft load increased, or by transferring a portion of the weight thereof to the vehicle.

It has been found however, that in using linkage mechanisms of this character with implements employing a heavy and long overhanging frame structure, such as in the case of a gang plow having three or more bottoms thereon and where the rearmost plow bottom extends outwardly an appreciable distance from the vehicle, the weight of the implement and its frame, by virtue of being displaced such a large distance from the vehicle, can cause a reaction on the draft-responsive member which overrides the reaction thereon caused by the draft load, thus causing a reversed or inverted reaction which tends to indicate a final resultant reaction that is not accurate or properly indicative of the true draft load on the implement. In fact, it was found that in such a situation the differential between the actual draft load reaction and that of the weight load of the implement and its frame was such that the resultant reaction of such forces tended to create a tensional loading force in the upper draft-responsive link member, instead of the compressive loading component ordinarily encountered therein as a result of an increase in the draft force, thereby giving a false sensing signal to the automatic control mechanism, whereupon the power lift assembly, in its effort to fulfill the demands registered thereon from such sensing response, would fail to provide the draft control adjusment necessary at a given moment. This condition is even more noticeable when the implement is of a light-draft type that is supported by a structure having a heavy overhanging frame so that the weight of said structure is displaced some distance from the vehicle.

In order to overcome the foregoing objectionable tendency of such hitch linkages and thereby make it adaptable to all weight combinations of implements and frame structures it was found desirable to endeavor to eliminate the effect of the support of an implement by the ground, or, otherwise stated, to eliminate the effect of implement weight reaction on the draft responsive member of the linkage and thus assure that the force reacting on said draft-responsive member would be indicative only of the resultant draft load on the implement, and it is believed the invention outlined hereinafter successfully accomplishes such a goal.

A unique and unusual feature of the present invention therefore, is to provide an improved agricultural implement attaching hitch linkage mechanism which, when employed on a tractor vehicle having automatic draft control lift means for raising and lowering said implement, operates to cancel-out or effectively minimize the effect of implement weight displacement resulting from a long overhang of the implement and its frame from the vehicle, and thereby permit the true draft loads imposed on the implement to be registered by way of a draft-responsive device on the draft control lift means associated therewith.

An important object of the invention is to provide a hitch linkage mechanism, adaptable for use with a light-draft type agricultural implement wherein the implement is mounted by a frame that provides an appreciable overhang from the vehicle upon which it is mounted, that is arranged so as to permit cancellation of the reactive effect of the implement weight or of the location of the center of gravity thereof on a sensing member of the linkage, thereby permitting a force reaction properly indicative of the true draft load being imposed upon the implement to be registered on a draft-responsive device actuable by said linkage.

Another important object is to provide an improved hitch linkage mechanism for attaching an agricultural implement to a vehicle and which is operative for registering and transmitting an accurate control signal to a power lift device in response to variations in draft loads on a light-draft implement of the type that provides an appreciable weight mass displacement overhang from the vehicle.

A further important object is to provide an agricultural implement-attaching hitch linkage mechanism which, when employed with a tractor vehicle having automatic draft control lift means for raising and lowering said implement responsive to variations in draft loads thereon, is operative for permitting longitudinal movement of the linkage resulting from variations of said draft loads without tilting the implement about a horizontal axes or a fore and aft direction or otherwise changing the pitch of the implement while describing the path of said longitudinal movements.

Another object is to provide a three-point hitch linkage mechanism having means operatively interconnecting the upper and lower links thereof at points closely proximate the points of attachment of the hitch mechanism to the vehicle and which is operative for effecting a movement in unison of all of said links.

A further object is to provide a three-point hitch linkage mechanism having articulating means operatively interconnecting the upper and lower link members, for effecting movement in unison thereof, of said linkage mechanism at points proximate the ends of said link members disposed futhermost from the implement attached by said linkage to a vehicle.

A still further object is to provide a three-point hitch linkage mechanism having force-transmitting means interconnecting the upper and lower links of said mechanism, which means is operative to cause said upper and lower links to move in unison and generally as a parallel linkage whereby the upper and lower links thereof, upon longitudinal movement of an agricultural implement resulting from variations of the draft loads imposed upon the implement attached by said linkage to a vehicle, move generally parallel to one another without causing any appreciable variation in the spacing between said links during such longitudinal movement.

A yet still further object is to provide an improved three-point hitch linkage that is operative for accurately sensing variations in draft loads imposed upon an attached implement and thereafter providing accurate sensing signals to an associated power lift device which latter device is operative for effecting accurate draft control of the implement in consonance with said draft load variations.

The foregoing and other objects and advantages are obtained by the present invention, various novel features of which will be apparent from the description herein and the accompanying drawings disclosing several embodiments of the invention, and will be more particularly pointed out in the appended claims.

FIG. 1 is a generally schematic side elevational view of a hitch linkage mechanism, according to the present invention, which is mounted on one end of a tractor vehicle and shown employed in association with a plow frame (fragmentarily indicated) borne by the vehicle.

FIG. 2 is a vertical sectional view of the hitch linkage shown in FIG. 1 and taken on line 2—2 thereof.

FIG. 3 is a vertical sectional view of the hitch linkage shown in FIG. 1 and taken on line 3—3 thereof.

FIG. 4 is a view similar to FIG. 1 but showing a modified form of the proposed invention.

FIG. 5 is a vertical sectional view taken generally on line 5—5 of FIG. 4.

FIG. 6 is a side elevational view of another modified form of structure for showing the teachings of the present invention, there being shown therein only limited portions of the associated linkage mechanism, vehicle and implement.

FIG. 7 is a vertical sectional view taken generally on line 7—7 of FIG. 6.

FIG. 8 is a schematic representation of the linkage mechanism of the form of the invention shown in FIGS. 1–3.

Referring now to the drawings, it will be noted there is depicted in FIG. 1 one preferred embodiment of the present invention, but it will be appreciated that this is generally illustrative and should not be considered as limiting since the invention is susceptible of other variations as evidenced, among others, by succeeding figures of the drawings.

As shown in FIG. 1, the invention is employed with a conventional tractor vehicle, shown only fragmentarily and indicated generally by the reference character 10, and having a frame 11 and a pair of rear wheels one of which one of which is illustrated by the numeral 12. A rockshaft 13 is pivotally mounted on a portion of the frame 11 and is adapted for operative connection, by any well known means such as the motion-transmitting mechanism shown at 14, to a power lift assembly shown generally at 14a Since power lift devices for such purposes are so well known and universally employed on vehicles today it was felt no useful purpose would be served to further illustrate details and to describe the specific operation of any particular such device herein. Suffice it to say that the power lift unit, whatever type it may be, is intended to rotate the rockshaft 13 and thereby raise or lower the attached implement with a reasonable measure of fidelity in consonance with the variations in draft loads imposed upon the implement as is well understood in the art.

Although the proposed invention may be used with practically all types of earth-working agricultural implements, the implement selected for illustration herein is a gang-type of moldboard plow, such as shown generally at 15, having a plurality of bottoms 16 thereon that are carried by a rigid beam-like frame structure 17. The frame 17 which may be generally conventional in construction is fashioned with the vertical mast member 18 resembling an inverted figure T with the stem thereof comprising two parallel and spaced-apart members 19–19a with a centrally positioned single upper pivotal connecting pin 20 therein, while the transverse member of the mast includes a bar 21 providing a pair of laterally spaced lower pivotal mounting pins such as 22, 22a on opposite ends thereof.

The implement frame 17 is connected or coupled to the vehicle frame 11 through a three-point hitch linkage mechanism which includes an upper link 23 having the outer or rearward end thereof pivotally connected to pin 20, and a pair of laterally spaced lower links 24, 24a the outer or rearward ends of each of which are pivotally connected to a respective pin 22, 22a. The forward or inboard ends of said lower links are pivotally mounted on the respective ends of the transversely spaced crank arms 25, 25a which are mounted upon and constrained for rotation with a transverse shaft, such as 26, pivotally carried by the vehicle frame 11 and which is provided with a lever 27 affixed thereto proximate the midpoint thereof thus constituting a bell-crank, indicated generally at 27a, fashioned by the integrally connected crank arms 25, 25a, shaft 26 and lever 27. The opposite end of lever 27 is pivotally connected by a pin such as 28 to one end of a split bail-like rocker or walking beam assembly 29 having spaced-apart arms 30, 30a longitudinally slotted as at 31, 31a and, in turn, pivotally and slidably mounted on a pin such as 32 that projects through said slots and is fixedly anchored by a bracket 33 carried by the frame 11. The opposite or upper end of each of the arms 30, 30a has a slotted opening or recess 34, 34a extending inwardly from the end face of each said arm that is adapted to slidably accommodate in straddle or bail-like fashion a pin, such as 35, affixed to a horizontally positioned actuator draft or stress-responsive member 36, while said actuator is pivotally connected by a pin 37 at one end thereof to the free or inner end of the upper link 23. Support brackets or blocks 38, 38a which are suitably secured to the the frame 11 are fashioned with aligned openings 39, 39a therethrough for slidably accommodating the actuator member 36. A collar-like head 40 on the inner end of the draft-responsive actuating member 36 serves as an abutment for one end of a coil spring 41 disposed to envelop a portion of said actuator member while the opposite end of said spring rests and reacts against or abuts the forwardmost bracket 38a. As thus disposed the spring is reactively compressible between the head 40 and the bracket 38a to resist longitudinal rearward movement of the response member 36. An enlarged head 42 on the opposite end of the actuator member 36 is dimensioned to overlap the opening 39 in the rearmost support bracket 38 and thus acts as a stop means to prevent inward movement of said actuator member beyond a predetermined position. An operating linkage, shown in part by the reference character 42a, constitutes the signal transmitting means for interconnecting the stress-responsive member and the power lift means 14a.

The rockshaft 13 has a pair of lift or rocker arms 43, 43a disposed at opposite ends thereof that are constrained for rotation with said shaft and the opposite or free ends of said rocker arms are pivotally connected one each to a respective lift arm 44, 44a that, in turn, is pivotally connected to a respective lower link 24, 24a. Thus when the rockshaft 13 is rotated by way of the mechanism 14 and the power lift means 14a the implement attaching hitch linkage mechanism is correspondingly raised or lowered through the resultant movements of the interconnecting rocker arms 43, 43a and the lift arms 44, 44a, as well understood.

In order to better understand the operation of the invention an explanation of the relationships of the forces encountered by the hitch linkage mechanism and the manner in which it is believed these forces react may be in order. Assume first that since the vehicle is at rest the implement, such as the plow illustrated, is not being subjected to any draft forces whereupon the hitch linkage components may be positioned substantially as shown in FIG. 1. In this case the draft force, indicated by the letter D (FIG. 8), acting on the plow as well as the vertical soil reaction force, indicated by the letter L, acting thereon will be zero, while the force, indicated by the letter W, resulting from the weight of the plow and its frame acting in a generally vertical direction will cause the implement frame to tend to rotate counterclockwise about the pivotal pins 22, 22a. Incident to this rotational tendency a compressive force is set up in the lower links 24, 24a, and, because of the tendency of the plow and its frame to rotate about the pins 22, 22a, the upper link 23 will have a force in tension created therein since said link is resisted against movement at its inboard end by the spring 41. With the upper link in tension there is a reactive tendency acting through the pin 35 tending to rotate the rocking assembly 29 in a counterclockwise direction about its pivot 32 and, through the interconnecting pin 28, causing the interconnected bell-crank 27a to tend to rotate clockwise carrying the shaft 26 and crank arms 25, 25a therewith. However, since the opposite ends of these latter arms are pivotally connected each to a lower link 24, 24a, such rotational tendency will tend to put a compressive force in said lower links that will act to oppose the compressive force therein resulting from the weight reaction on pins 22, 22a. Now if moment arms as represented by the lengths of the crank arms 25, 25a and lever 27 are equal to the moment arms represented by the portions of rocker assembly 29 between pins 35 and 32 and pins 32 and 28, respectively, these two forces will balance out thus putting the linkage in equilibrium and there will be no actual movement of the implement attaching linkage. Since the upper link 23 cannot move except in concert with the lower links 24, 24a there will be no movement of the stress-responsive member 36, associated in this instance with the upper link, and hence no adjustment or correction of the automatic control of the power lift assembly will be forthcoming because the result of the weight reaction thereon will be nil.

Assume next that the vehicle is in motion and the implement is being subjected to draft loading in the earth. In this case the vertical soil reaction force (L) and the draft load force (D) will cause a resultant reaction that may be indicated by the letters DL. The direction of this resultant reaction because of well known design characteristics of the implement will be generally parallel to the hitch linkage mechanism and thus will tend to place the lower links 24, 24a in tension while the upper link 23 is placed in compression. Since these links are interconnected through the rocker assembly 29 and the associated bell-crank 27a there would ordinarily be a tendency to balance out these forces and thus stabilize the linkage. However, in the proposed linkage because of the moment arm relationships therein the force of tension in the lower links will be substantially double that in the upper links thereby easily overriding the compressive reaction in said upper link. This differential in forces causes both the upper and lower links to move longitudinally rearwardly responsive to a draft load increase sufficient to cause the actuator member 36 to compress the spring 41, whereupon the interconnecting signal transmitting means 42a transmits a demand signal to the power lift means 14a which then reacts in fulfillment of such signal to rotate the rockshaft 13 and adjust the implement according to said draft load requirement. As a result the implement is adjusted according to the draft load imposed thereon at a given moment regardless of any weight reaction set up in the linkage by virtue of the weight of the implement and its frame. Hence, any draft load imposed on the implement regardless of how light or heavy such draft loading may be will be registered through the draft-responsive mechanism so as to provide an accurate signal for motivating the associated power lift means.

In FIGS. 4 and 5 there is illustrated a modified form of the present invention wherein the stress-responsive member registers draft reaction by way of the lower link instead of by way of the upper link as previously described. In this instance the plow frame 17 is also carried by lower pivot pins 22, 22a and an upper pin 20 on the three-point hitch linkage which includes a pair of spaced lower links 24, 24a and a single upper link 23 that, in turn, are coupled to the vehicle. The inboard ends of the lower links are pivotally connected, respectively, by pins 122, 122a to crank arms 125, 125a which, in turn, are mounted on and constrained for rotation with a shaft 126 pivotally carried by the vehicle frame 11. Mounted on the shaft 126 and constrained for rotation therewith is a lever 127 so that as arranged the arms 125, 125a, shaft 126 and lever 127, in effect, provide a bell-crank device indicated generally by the reference character 127b. The lever 127 has a slotted recess 134 extending inwardly from the end face of the free end thereof which is fashioned to slidably accommodate a pin 135 fixedly positioned or anchored in a bifurcated free end portion of a link member 130. The opposite end of link member 130 is mounted on a shaft 135 for rotation therewith and said shaft is pivotally carried by brackets, such as 136, 136a, mounted on the vehicle frame 11. A pair of spaced-apart crank arms 137, 137a mounted for rotation with the shaft 135 have a pin 138 anchored in the free ends thereof for pivotally supporting the free end of the upper link member 23. A pivot pin 139 fixed to the lever 127 pivotally receives one end of an actuator member 133 the opposite end of which has secured thereon a collar-like head 140. Positioned around the actuator 133 and between the collar 140 and a bracket-like abutment 143 carried by the frame 11 is a spring 141. A signal transmitting means, shown in part by the reference character 142, is constrained for movement with the spring 141 and interconnects said spring with the associated power lift control means 114a so that sensing signals registered by said spring may be transmitted to said lift means. A stop member such as the bracket-line abutment 144 is mounted on the frame 11 and serves to limit forward movement of the lever 127. As before, the rockshaft 13 is connected by rocker arms 43, 43a and lift arms 44, 44a (only one of each of which is shown) with the respective lower links 24, 24a. In this modification when the levers 127 and 130 are of equal length and the crank arms 125, 125a are of the same length as the arms 137, 137a the weight reaction forces will be balanced and the linkage put in equilibrium so that only true draft forces will register on the response member 133.

In FIG. 6 there is illustrated a further modification of the means for interconnecting the inboard ends of the three-point hitch linkage in order to meet the teachings of the present invention. In this view, which is generally fragmentary, neither the attached implement nor the completed hitch structure has been shown since these components are the same as heretofore described in connection with the structures depicted in FIGS. 1–5.

The upper link 23 of the three-point hitch linkage mechanism has the inboard or forward end thereof connected to a transverse member 235 that, in turn, is pivotally connected as at 237, 237a to one leg of the upper bell-cranks, indicated generally by the reference character 236, 236a which are pivotally mounted at 238, 238a to brackets 239, 239a, in turn, carried by the vehicle frame 11. Each of the lower links 24, 24a is pivotally connected, as shown for instance at 225, 225a, to respective lower bell-crank 226, 226a that is pivotally mounted as at 227, 227a by brackets 228, 228a, in turn, carried by the vehicle frame 11. An interconnection between the lower bell-cranks 226, 226a and upper bell-crank 236 includes a transverse shaft member 229b whose opposite ends are carried at 229, 229a by the respective bell-cranks 226, 226a and the vertical link members 230, 230a thereof that have the upper ends thereof pivotally connected as at 231, 231a to the other leg of the upper bell-cranks 236, 236a. An extension 224 of the lower link 24 has a collar-like head 240 thereon which abuts a spring 241 disposed between said head and an abutment 243 affixed to the vehicle frame 11. A signal transmitting means, shown in part by the reference character 242, is adapted for transmitting sensing signals from the responsive member 224 to the power lift means as is well understood. An abutment such as 244 affixed to the frame 11 provides a stop for limiting forward movement of the bell-crank 226. In this structure when the distance of the lower bell-crank arm between pivot points 225 and 227 equals that of the comparable upper arm between points 237 and 238, and the lower arm between points 227 and 229 equals the upper arm between 231 and 238 the weight reaction forces will be balanced and the linkage put in equilibrium so that only true draft forces will register on response member 224.

While only a limited number of forms of the invention have been shown, it will be obvious to those skilled in the art that it is not so limited, but is susceptible of various changes and modifications without departing from the spirit thereof, and it is desired, therefore, that only such limitations shall be placed thereupon as are specifically set forth in the appended claims.

What is claimed is:

1. A hitch linkage mechanism for coupling an earth-working implement to a vehicle, comprising: an upper link, and a pair of aligned and laterally spaced lower links all of which links are pivotally connected at one end of the links to an earth-working implement; pivotal means connecting opposite ends of said lower links onto the vehicle; slidable and pivotal means connecting the opposite end of said upper link to the vehicle; articulating linkage means interconnecting said pivotal means and said slidable and pivotal means for effecting longitudinal movement of said upper and lower links in unison when said links are displaced longitudinally relative to said vehicle in response to draft forces imposed on the implement; and spring means between said vehicle and said slidable and pivotal means and reactively disposed for normally resisting rearward longitudinal movement of said links relative to said vehicle in response to draft forces on said implement.

2. A hitch linkage mechanism for coupling an earth-working implement to a vehicle, comprising: an upper link, and a pair of aligned and laterally spaced lower links all of which links are pivotally connected at one end of the links to an earth-working implement; pivotal means connecting opposite ends of said lower links onto the vehicle; slidable and pivotal means connecting the opposite end of said upper link to the vehicle; articulating linkage interconnecting said pivotal means and said slidable and pivotal means, including a beam member having one end thereof slidably connected for movement with said slidable and pivotal means and being pivotally mounted proximate a mid-point thereof on said vehicle, and a lever affixed to said pivotal means for movement therewith and being pivotally connected at the free end thereof to an opposite end of said beam member; said linkage being operative for effecting movement in unison of said upper and lower links when said links are displaced longitudinally relative to the vehicle in response to draft forces acting on the implement; spring means between the vehicle and said slidable and pivotal means reactively disposed for normally resisting longitudinal movement in one direction of said links relative to the vehicle; and stop means cooperative between the vehicle and said slidable and pivotal means for limiting longitudinal movement in an opposite direction of said links relative to the vehicle.

3. A hitch linkage mechanism for coupling an earth-working implement to a vehicle, comprising: an upper link, and a pair of aligned and laterally spaced lower links all of which links are pivotally connected at one end of the links to an earth-working implement; pivotal means connecting opposite ends of said lower links onto the vehicle; slidable and pivotal means connecting the opposite end of said upper link to the vehicle; articulating linkage interconnecting said pivotal means and said slidable and pivotal means including, a rocker member having one end thereof slidably connected for movement with said slidable and pivotal means and being pivotally mounted proximate a mid-point thereof for movement relative to the vehicle, and a lever affixed at one end thereof to said pivotal means for rotative movement therewith and having the free end of said lever pivotally connected to an opposite end of said rocker member, the axes of said pivotal means being midway between the axes of the pivotal connection of said lever with said rocker member and the axes of the pivotal connection with said lower link; said linkage being arranged for effecting movement in unison of said opposite ends of said upper and lower links when said links are displaced longitudinally relative to the vehicle responsive to variations in draft loads on the implement; spring means between the vehicle and said slidable and pivotal means reactively disposed for normally resisting longitudinal movement in one direction of said links relative to the vehicle; and stop means cooperative between vehicle and said slidable and pivotal means for limiting longitudinal movement in an opposite direction of said links relative to the vehicle.

References Cited by the Examiner

UNITED STATES PATENTS

| | | | |
|---|---|---|---|
| 2,480,387 | 8/49 | Smith | 172—7 |
| 2,701,508 | 2/55 | Richey | 172—7 |
| 2,722,874 | 11/55 | Bopf | 172—9 |
| 2,816,497 | 12/57 | Smith | 172—239 X |
| 2,844,083 | 7/58 | Dushane | 172—239 |

ABRAHAM G. STONE, *Primary Examiner.*

T. GRAHAM CRAVER, *Examiner.*